United States Patent
Lussier et al.

(10) Patent No.: US 9,605,169 B1
(45) Date of Patent: Mar. 28, 2017

(54) METHOD OF INKJET PRINTING GREEN IMAGES

(71) Applicant: Eastman Kodak Company, Rochester, NY (US)

(72) Inventors: Barbara Boland Lussier, Rochester, NY (US); Daniel Talbot Linehan, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

(21) Appl. No.: 15/092,647

(22) Filed: Apr. 7, 2016

(51) Int. Cl.
   *C09D 11/322* (2014.01)
   *B41J 2/21* (2006.01)

(52) U.S. Cl.
   CPC .............. *C09D 11/322* (2013.01); *B41J 2/21* (2013.01)

(58) Field of Classification Search
   CPC .................................. C09D 11/322; B41J 2/21
   See application file for complete search history.

(56) References Cited

U.S. PATENT DOCUMENTS

| | | |
|---|---|---|
| 5,279,654 A | 1/1994 | Keirs et al. |
| 5,750,323 A | 5/1998 | Scaringe et al. |
| 5,821,016 A | 10/1998 | Satoh et al. |
| 6,013,415 A | 1/2000 | Sakurai et al. |
| 6,100,312 A | 8/2000 | Suzuki et al. |
| 6,388,093 B1 * | 5/2002 | Chamberlain ....... C07D 487/04 548/453 |
| 6,589,330 B2 | 7/2003 | Kato et al. |
| 7,029,526 B2 | 4/2006 | Hall-Goulle et al. |
| 7,381,257 B2 | 6/2008 | Takayama et al. |
| 8,814,337 B2 | 8/2014 | Szajewski et al. |
| 9,499,706 B2 | 11/2016 | Jackson et al. |
| 2004/0185372 A1 * | 9/2004 | Takakuwa ............. G03F 7/0007 430/270.1 |
| 2007/0099096 A1 * | 5/2007 | Sasaki ................... G03F 7/0007 430/7 |
| 2007/0277701 A1 * | 12/2007 | Toyoda ............... C09B 29/0007 106/31.48 |

FOREIGN PATENT DOCUMENTS

| | | |
|---|---|---|
| JP | 10-160928 | 6/1998 |
| JP | 11-072616 | 3/1999 |

(Continued)

*Primary Examiner* — Stephen Meier
*Assistant Examiner* — Alexander D Shenderov
(74) *Attorney, Agent, or Firm* — J. Lanny Tucker

(57) ABSTRACT

Aqueous green inkjet ink compositions are prepared from aqueous organic pigment dispersions for use in various inkjet printing methods. In particular, these methods provide a green image or expanded color gamut for other inkjet printed colors. The aqueous organic pigment dispersion contains a green copper phthalocyanine pigment and an azo-coupled β-ketoamide pigment and an organic pigment dispersant. The weight ratio of the green copper phthalocyanine pigment to the azo-coupled β-ketoamide pigment is from 1:1 to 10:1. The median particle diameter of each of the green copper phthalocyanine pigment and the azo-coupled β-ketoamide pigment is less than 85 nm. At least 95% of the total particles of each of the green copper phthalocyanine pigment and the azo-coupled β-ketoamide pigment have a particle diameter of less than 150 nm.

14 Claims, 3 Drawing Sheets

(56) References Cited

FOREIGN PATENT DOCUMENTS

| | | |
|---|---|---|
| JP | 11-256053 | 9/1999 |
| JP | 11-310716 | 11/1999 |
| JP | 2001042117 | 2/2001 |
| JP | 2007-277566 | 10/2007 |
| WO | WO 98/45756 | 10/1998 |

\* cited by examiner

METHOD OF INKJET PRINTING GREEN IMAGES

RELATED APPLICATIONS

Reference is made to the following related copending and commonly assigned patent applications:

U.S. Ser. No. 15/092,642 filed on Apr. 7, 2016, by Lussier and Linehan and entitled "Aqueous Green Pigment Dispersions and Inkjet Compositions"; and U.S. Ser. No. 15/092,649 filed on Apr. 7, 2016 by Lussier and Linehan and entitled "Preparation of Aqueous Green Dispersions and Inkjet Compositions."

FIELD OF THE INVENTION

This invention relates to a method for inkjet printing aqueous green inkjet ink compositions that contain a green copper phthalocyanine pigment and an azo-coupled β-ketoamide pigment. The improved compositions can be used to provide inkjet printed images with expanded color gamut on various substrates using either drop-on-demand (DOD) or continuous inkjet processes (CIJ).

BACKGROUND OF THE INVENTION

Inkjet printing systems are generally of two types: DOD printing systems and CIJ printing systems. Inkjet printing is a standard method for printing a colored image onto a substrate wherein a stream of ink droplets are directed from a printing device to a surface of a suitable receiver element or substrate. The direction of the stream of droplets is controlled electronically in causing the droplets to print the desired image or information on the substrate surface without requiring contract between the printing device and the surface to which the ink is applied. Objects comprising substrates to which inkjet printing is well suited include but are not limited to, containers for consumer products, currency, draft checks, envelopes, letterhead, documents of various types, identification cards, lottery tickets, bank cards, identification strips, labels, brochures, signage, and other well-known materials.

Drop-on-demand printing systems are widely used in home or consumer inkjet printers and slower consumer printers, both of which have been available for several decades. As the name implies, this type of inkjet printing uses a printhead that ejects drops of ink only when signaled to do so by a digital controller.

CIJ printing systems generally comprise two main components, a fluid system (including an ink reservoir) and one or more printheads. Ink can be pumped through a supply line from the ink reservoir to a manifold that distributes the ink to a plurality of orifices, typically arranged in linear array(s), under sufficient pressure to cause ink streams to issue from the orifices of the printhead(s). Stimulations can be applied to the printhead(s) to cause those ink streams to form streams of uniformly sized and spaced drop, which are deflected in a suitable manner, into printing or non-printing paths. Non-printing drops can be returned to the ink reservoir using a drop catcher and a return line. Thus, in contrast to DOD printing systems, CIJ printing systems involves use of a continuous stream of ink drops that are separated to discriminate between spaced printing drops and non-printing drops. This discrimination can be accomplished by electrostatically charging the drops and passing the charged drops through an electric field. Charged drops are deflected by a charge field and can be caught and returned to the reservoir of ink. Uncharged drops are printed onto a substrate or receiver material. This discrimination can also be accomplished when the printhead digitally creates large and small drops. Small drops are deflected by an air current and returned to the reservoir of ink. Large drops, being less affected by the air current, are printed onto a substrate or receiver material. Some useful CIJ printing apparatus and printhead fabrication are described for example in U.S. Pat. No. 6,588,888 (Jeanmaire et al.) and U.S. Pat. No. 6,943,037 (Anagnostopoulos et al.).

In general, such pigment-based colored inks can comprise a wide variety of colored organic pigments that can be chosen depending upon the specific application and performance requirements for the printing system and desired printing results (for example, desired hue). For example, such organic or inorganic pigments can include but are not limited to, carbon black or other black pigments, red pigments, green pigments, blue pigments, orange pigments, violet pigments, magenta pigments, yellow pigments, and cyan pigments. The printed images using such pigment-based inks are generally desired to have a visual density of at least 0.5.

There are some commercially available green organic pigments that may be useful in inkjet ink formulations. Such green pigments can include copper phthalocyanine pigments having a copper phthalocyanine skeleton that are generally blue-green in hue. While it has been desired to formulate such green pigments into inkjet ink compositions for use in CIJ, it is highly important to keep the green pigment particle size very small, for example, where the median particle size (50% intensity mode) is less than 100 nm or even less than 85 nm, and at least 95% (intensity mode) of the particles have a particle size of less than 150 nm.

Yet, it has been difficult to mill the noted green organic pigments to such small particle sizes for incorporation into the inkjet ink compositions. When attempts were made to mill common green pigments to the desired particle size, the particle size is initially reduced but as milling continues, the particle size unexpectedly increases from agglomeration of the smaller particles. It became apparent that there is a need to effectively stabilize the green organic pigment particle size and to prevent particle agglomeration especially during the milling operation.

Moreover, there is a need to expand color gamut of green organic pigments beyond that possible with the pigments used alone while keeping the green organic pigments from premature agglomeration.

SUMMARY OF THE INVENTION

To address the problems noted above, the present invention provides a method of inkjet printing, which method comprises:

providing a substrate, ink jetting an aqueous green inkjet ink composition as spaced green drops to provide a green color image on the substrate, wherein the aqueous green inkjet ink composition comprises:

(a) an aqueous organic pigment dispersion comprising:
a green copper phthalocyanine pigment,
an azo-coupled β-ketoamide pigment, and
at least one organic pigment dispersant in an amount of at least 40 weight % and up to and including 100 weight %, based on the sum of the weights of the green copper phthalocyanine pigment and the azo-coupled β-ketoamide pigment, the weight ratio of the green copper phthalocyanine pigment to the azo-coupled β-ketoamide pigment is from 1:1 to and including 10:1, and the median particle diameter of each of the green copper phthalocyanine pigment and the azo-coupled β-ketoamide pigment is less than 85 nm and at least 95% of the total particles of each of the green copper phthalocyanine pigment and the azo-coupled β-ketoamide pigment have a particle diameter of less than 150 nm when measured in intensity mode using a laser light scattering particle size analyzer, and (b) at least one humectant, the aqueous green inkjet ink composition having a viscosity of less than 3 centipoise (0.003 N-sec) at 25° C.

In some embodiments, this method comprises:

ink jetting the aqueous green inkjet ink composition from a main fluid supply as a continuous stream that is broken into both the spaced green drops and non-printing green drops; and collecting and returning the non-printing green drops to the main fluid supply.

In some embodiments, the aqueous green inkjet ink composition is provided as spaced green drops and non-printing green drops using a continuous inkjet printing apparatus.

Moreover, in other embodiments, the method can comprise:

delivering an aqueous green inkjet ink composition to a first drop generator mechanism, ejecting the aqueous green inkjet ink composition from the first drop generator mechanism as spaced green drops in a controlled manner to provide a green color image on the substrate;

delivering an additional aqueous color inkjet ink composition to a second drop generator mechanism, which additional aqueous color inkjet ink composition comprises a colorant that is not a green colorant, and ejecting the additional aqueous color inkjet ink composition from the second different drop generator mechanism as spaced additional color drops in a controlled manner to provide an additional color image on the substrate.

In such embodiments, this method can also comprise:

delivering the additional aqueous color inkjet ink composition from a second main fluid supply as a continuous stream that is broken into both the spaced additional color drops and additional non-printing color drops;

collecting and returning the additional non-printing color drops to the second main fluid supply.

The present invention further comprises an ink set comprising at least the following individual inks:

an aqueous green inkjet ink composition of any embodiment of this invention; and one or more additional aqueous color inkjet ink compositions, each comprising at least one colorant that is not a green colorant.

The present invention provides green images using improved green organic pigment dispersions and aqueous green inkjet ink compositions that can exhibit expanded color gamut (or color space) when used with various ink sets to provide desired CIELAB L*, a*, and b* values. For example, the aqueous green inkjet ink compositions used according to the present invention can be used in ink sets to provide expanded color gamut when the various aqueous color inkjet ink compositions are inkjet printed. Thus, the present invention allows for improved color reproduction of an original color image when the aqueous green inkjet ink composition is inkjet printed underneath or over one of the other aqueous color inkjet ink compositions. The aqueous green inkjet ink composition can also be used as an advantageous starting point for the creation of a "spot" color.

In addition, the inventive aqueous organic pigment dispersions and aqueous green inkjet ink compositions exhibit improved shelf life as there is minimal agglomeration of the organic pigments contained therein. Such aqueous organic pigment dispersions can be prepared using typical milling procedures without significant agglomeration of pigment particles. These advantages are achieved by using a combination of a green copper phthalocyanine pigment and an azo-coupled β-ketoamide pigment in the noted weight ratios. The presence of the noted azo-coupled β-ketoamide pigment helps maintain the green organic pigment in the desired particle size during milling and during storage and use in the aqueous green inkjet ink compositions. These advantages were not achieved by using the green copper phthalocyanine pigments alone and it was unpredictable and unexpected that such results could be achieved by physically mixing them with a specific class of yellow pigments.

DETAILED DESCRIPTION OF THE INVENTION

Figure 1:
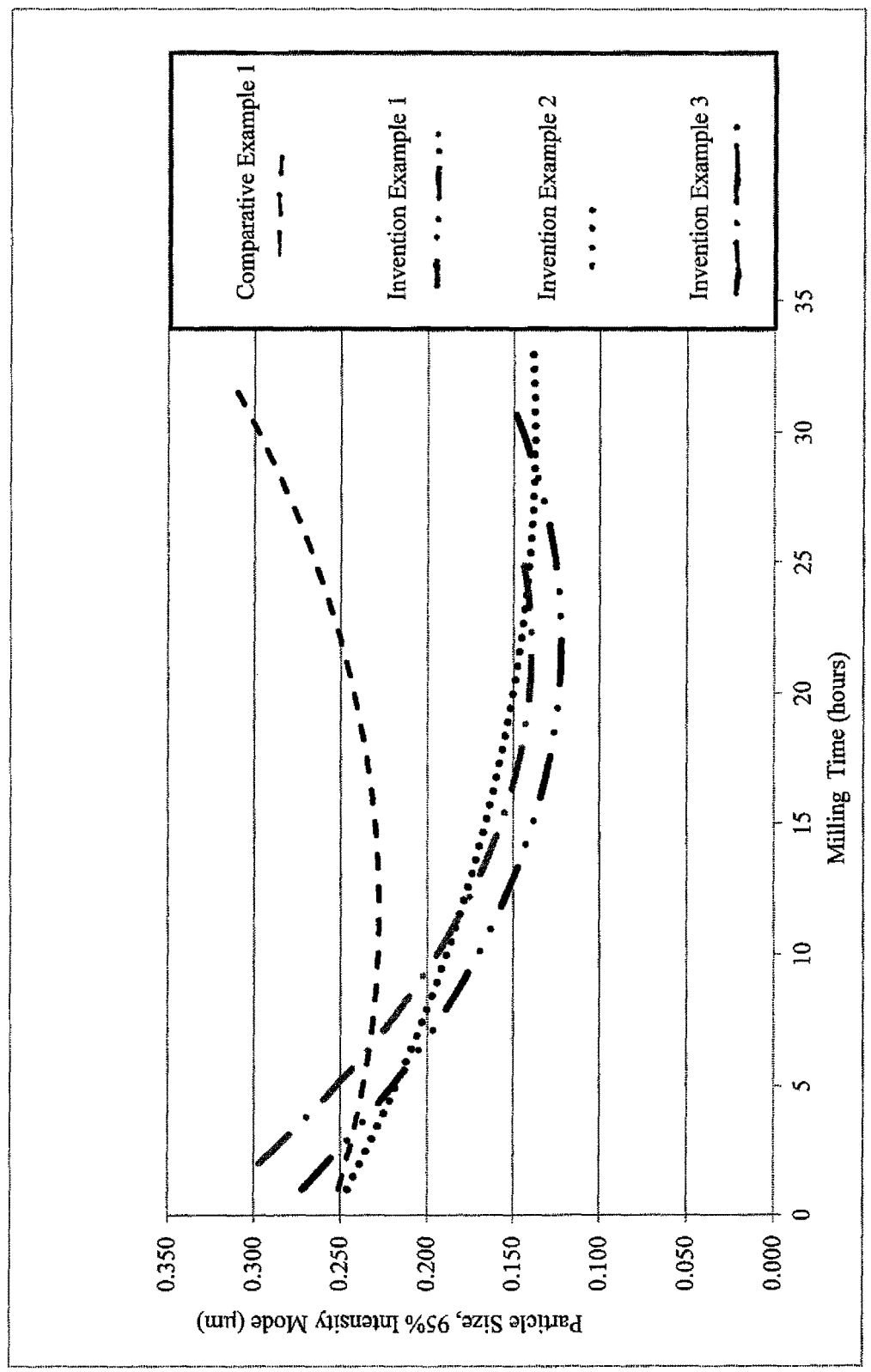
FIG. 1 is a graphical representation of particle size (95% intensity mode in μm) vs. milling time (hours) for Dispersions 1 to 4 as described in the Invention Examples 1-3 and Comparative Example 1 below.

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described for any embodiment.

DEFINITIONS

As used herein to define various components of the aqueous organic pigment dispersions and aqueous green color inkjet ink compositions, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered to be approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "aqueous green color inkjet ink composition," "green color ink composition," and "green ink" are meant to refer to embodiments used in the present invention.

As used herein, the parameter "acid number" (also known as acid value) is defined as the milligrams (mg) of potassium hydroxide required to neutralize 1 g of the described acidic polymer.

When the term "green" is used in defining embodiments of aqueous organic pigment dispersions and aqueous green inkjet ink compositions, it is used to refer to a "color" or hue of ink jetted images that are considered "green" by normal convention. For example, the resulting green ink jetted images achieved by the embodiments according to the present invention can be defined using the known CIELAB chromaticity parameters L*, a*, and b* wherein L* (lightness) is generally at least 20 and up to and including 90 (or at least 40 and up to and including 75), a* is at least −80 and up to and including −20 (or at least −80 and up to and including −50), and b* is at least 20 and up to and including 80 (or at least 20 and up to and including 60) when the aqueous green inkjet ink composition is dried on a coated paper substrate and as analyzed in accordance with ISO 13655, D50 illuminant, 2° observation.

The term "aqueous" in aqueous organic pigment dispersions and aqueous green inkjet ink compositions as used in the present invention means that the water content is greater than 50 weight % based on the total dispersion or composition weight. Thus, water is the predominant solvent.

The aqueous green inkjet ink compositions described herein are not considered "curable" or "radiation-curable" meaning that they contain less than 1 weight % of curable materials that can be cured, crosslinked, or polymerized in response to electromagnetic radiation (such as UV or actinic radiation) based on the total weight of the aqueous green inkjet ink composition (including water).

Particle size for the various green copper phthalocyanine pigments and azo-coupled β-ketoamide pigments refers to the approximate diameter of a generally spherical pigment particle or to the approximate largest characteristic dimension of a non-spherical particle. The desired median primary particle diameter (or $50^{th}$ percentile, or 50%, Intensity mode particle size) of each of the organic pigments in the aqueous organic pigment dispersions and aqueous green inkjet ink compositions used in this invention is less than 85 nm and at least 95% of the total primary particles of each of the green copper phthalocyanine pigment and the azo-coupled β-ketoamide pigment have a particle diameter of less than 150 nm. This refers to the $95^{th}$ percentile (or 95%) Intensity mode particle size that is the classified particle size distribution such that 95% of the volume of organic pigment particles is provided by particles having diameters smaller than the indicated diameter. Similarly, the $50^{th}$ percentile Intensity mode particle size refers to the classified particle size distribution such that 50% of the volume of organic pigment particles is provided by particles having diameters smaller than the indicated diameter. Particle size (or particle volume) can be readily measured using a conventional laser light scattering instrument.

The organic pigments used in the various embodiments of the present invention are generally not self-dispersing meaning that the organic pigment particles are not purposely surface treated to provide dispersibility in aqueous formulations, but some surface treatment can be present as provided by a commercial manufacturer of the pigments. Thus, such organic pigments generally require the presence of one or more organic pigment dispersants generally to keep them suspended in an aqueous medium.

The terms "water-soluble" and "aqueous-soluble" mean that 2% by mass or more of a material can be dissolved in distilled water at 25° C., or particularly at least 5% by mass of such material can be so dissolved to provide a homogeneous and visibly clear solution.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling. Polymers can be prepared from ethylenically unsaturated polymerizable monomers using free radical polymerization or acid catalyzed polymerization processes, or by reaction of appropriate condensation monomers (for example diols and diisocyanates) using known condensation polymerization processes.

Unless otherwise indicated, the terms "polymer" and "polymeric" refer to homopolymers and copolymers, each having a molecular weight ($M_w$) of at least 5,000 and generally of at least 100,000 as measured using gel permeation chromatography (polystyrene standard).

The term "copolymer" refers to polymers that are derived from two or more different monomers, in random order or a predetermined order (for example, block) along the polymer backbone. That is, each copolymer comprises at least two recurring units having different chemical structures.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers. However, other backbones can include heteroatoms wherein the polymer is formed by a condensation reaction or some other means.

Aqueous Organic Pigment Dispersions

Each aqueous organic pigment dispersion used in the present invention has a distinctive "green" hue or color as defined by the L*, a*, and b* CIELAB chromaticity parameters noted above, and can be used to provide expanded color gamut (color space) when used alone or mixed with other hues from inkjet printing multiple colors, for example, from an ink set comprising the aqueous green inkjet ink composition.

Two different colored organic pigments are essential for the aqueous organic pigment dispersions in order to obtain the desired particle size, color (hue), and particle stability described herein. The use of other colored organic pigments or combinations thereof do not provide the same properties and benefits.

The first essential organic pigment is a green organic pigment having a copper phthalocyanine skeleton, which green organic pigments can be obtained from various commercial sources and includes but is not limited to those organic pigments commonly known as C.I. Pigment Green 7 (Sun Chemical) and C.I. Pigment Green 36. For example, C.I. Pigment Green 7 is a halogenated copper phthalocyanine pigment having a chlorine atom and a bromine atom as substituents. C.I. Pigment 36 is also a halogenated copper phthalocyanine pigment having a bromine atom and a chlorine atom as substituents but it has a higher bromine atom content compared to C.I. Pigment Green 7. Particularly useful green organic pigments are those that are halogenated green copper phthalocyanine pigments as opposed to halogen-free green pigments.

The second essential organic pigment is an azo-coupled β-ketoamide pigment that can be obtained from various commercial sources and includes but is not limited to yellow azo-coupled β-ketoamides such as those pigments commonly known as Pigment Yellow 74 as well as Pigment Yellow 1, 2, 3, 4, 5, 6, 9, 55, 61, 62, 65, 73, 75, 81, 83, 97, 98, 111, 116, 155, and 167. Yellow mono-azo-coupled β-ketoamide pigments are particularly useful compared to yellow bisazo- (or disazo-) pigments.

It is desired that each of the noted organic pigments have the particle sizes ("primary" particle sizes) described above for use advantageous use in the aqueous organic pigment dispersions and aqueous green inkjet ink compositions of the present invention.

In addition, the weight ratio of the green copper phthalocyanine pigment to the azo-coupled β-ketoamide pigment in both the aqueous organic pigment dispersions and aqueous green inkjet ink compositions used in this invention is from 1:1 to and including 10:1, or from 3:1 to and including 6:1. Thus, in all embodiments, the amount of the organic green pigment is equal to or greater than the amount of the azo-coupled β-ketoamide pigment, in most embodiments, the amount of the organic green pigment is greater than the amount of the organic yellow azo-coupled β-ketoamide pigment so that the desired "green" color gamut is obtained in the resulting aqueous green inkjet ink composition and images printed solely therefrom.

The amount of the green copper phthalocyanine pigment present in the organic pigment dispersions can vary depending upon the dispersing medium, techniques, and equipment that are used for preparation, but in most embodiments, the amount is at least 4 weight %, or at least 5 weight %, and up to and including 12 weight %, or even up to and including 15 weight %, all based on the total weight of the aqueous organic pigment dispersion (including all other solids and solvents).

In embodiments of this invention, a green copper phthalocyanine pigment and an azo-couple β-ketoamide pigment described herein can be dispersed in a single aqueous medium using one or more suitable organic pigment dispersants and dispersing equipment to provide a single "master" aqueous organic pigment dispersion using conditions and equipment described below, which is then mixed with a suitable humectant to prepare an aqueous green inkjet ink composition described below.

As the two organic pigments are provided in a single dispersion, the organic pigments can be subjected to a milling or dispersing process to break up pigment particles into primary particles of the desired size wherein a primary particle is defined as the smallest identifiable subdivision in a particulate system.

For example, milling can be carried out using any type of grinding mill such as a media mill, ball mill, a two-roller mill, a three-roller mill, a bead mill, or an air-jet mill, or by using an attritor or liquid interaction chamber. During this milling process, the noted organic pigments are generally suspended in a suitable aqueous medium that is typically the same or similar to the medium used to prepare the aqueous green inkjet ink composition used in this invention. Inert milling medium can be present in the milling step in order to facilitate breaking up the pigment into primary particles. Inert milling media can include such materials as glasses, polymeric beads (such as crosslinked polystyrene beads), ceramics, metals, and plastics as described for example in U.S. Pat. No. 5,891,231 (Gnerlich et al.). Milling media are generally removed from the aqueous organic pigment dispersion in a suitable manner.

One or more organic pigment dispersants are generally used in the milling process in order to maintain primary particle stability dispersed and to prevent settling or agglomeration in the aqueous medium. Organic pigment dispersants useful for this purpose include but are not limited to those already well known for this purpose in the inkjet printing industry.

Polymeric organic pigment dispersants are also known and useful in the present invention. Such materials can be added prior to or during the milling step and can include homopolymers or copolymers that are nonionic or charged in nature. They can be random, block, or graft polymers, and can include both hydrophilic and hydrophobic portions or backbone segments or side chains Examples of useful polymeric organic pigment dispersants are described for example in Col. 9 (line 36) to Col. 11 (line 9) of U.S. Pat. No. 8,814,337 (Szajewski et al.), the disclosure of which is incorporated herein by reference. Particularly useful polymeric organic pigment dispersants are those prepared from: one or more hydrophobic monomers such as benzyl methacrylate, benzyl acrylate, various methacrylic acid or acrylic acid esters containing an aliphatic chain having 12 or more carbon atoms (such as stearyl methacrylate, stearyl acrylate, and others mentioned in Col. 10, lines 5-11 of U.S. Pat. No. 8,814,337 noted above); and one or more hydrophilic monomers having a net negative charge such as methacrylic acid, acrylic acid, or itaconic acid. Further details about useful polymeric organic pigment dispersing agents are provided in the noted teaching of U.S. Pat. No. 8,814,337 (noted above). For example, a useful polymeric organic pigment dispersant is an anionic benzyl methacrylate copolymer that is prepared at least from benzyl methacrylate and methacrylic acid and a representative copolymer of this type is described below in Invention Example 1.

Useful polymeric organic pigment dispersants can have a molecular weight of at least 500 Daltons and up to and including 50,000 Daltons, but more likely less than 15,000 Daltons.

One or more polymeric or non-polymeric organic pigment dispersants can be present in the aqueous organic pigment dispersions used in this invention in an amount of at least 40 weight % or more likely in an amount of at least 60 weight %, and up to and including 100 weight %, or more likely up to and including 75 weight %, all weights based on the sum of the weights of the green copper phthalocyanine pigment and the azo-coupled β-ketoamide pigment.

The aqueous organic pigment dispersions prepared for the present invention generally contain only the essential colored organic pigments noted above, individually or in a mixture, one or more organic pigment dispersants as described above, and the necessary aqueous medium that is primary water (at least 60 weight % and up to and including 100 weight % of all solvents). No other components are generally purposely added but addenda can be present as impurities in commercial grade colored organic pigments or from in the organic pigment dispersants.

A representative method for making the aqueous organic pigment dispersions used in this invention is provided below in the working examples.

Aqueous Green Inkjet Ink Compositions

An aqueous organic pigment dispersion used for this invention can be mixed with one or more humectants to provide an aqueous green inkjet ink composition used in the present invention. The components are formulated in an aqueous medium (predominantly water) to provide a viscosity of less than or equal to 3 centipoise (0.003 N-sec), or less than or equal to 2 centipoise (0.002 N-sec), or even less than or equal to 1.5 centipose (0.0015 N-sec), all measured at 25° C. using a standard viscometer. Representative aqueous green inkjet ink compositions and methods for making them are described below in the working examples.

The formulation of the various components does not substantially change the weight ratio of green copper phthalocyanine pigment to the azo-coupled β-ketoamide pigment provided in the aqueous organic pigment dispersion, that is a weight ratio of from 1:1 to and including 10:1 or from 3:1 to and including 6:1. The color or hue is not substantially changed from that of the aqueous organic pigment dispersion, as defined above by the CIELAB color characteristics. The amount of the green copper phthalocyanine pigment in the aqueous green inkjet ink compositions is at least 1 weight % or even at least 1.25 weight %, and up to and including 4 weight % or up to and including 5 weight %, based on the total weight of the aqueous green inkjet ink composition.

The aqueous green inkjet ink composition used in the present invention comprises one or more humectants that are generally water soluble or water miscible organic solvents having a viscosity that is greater than 40 centipoise or even at least 100 centipoise when measured at 25° C. For example, any water-soluble humectant known in the inkjet art that is compatible with the other requirements of the invention can be used. While an individual humectant can be employed, mixtures of two or more humectants, each of which imparts a useful property, can be used. Representative humectants useful in the aqueous green inkjet ink compositions include but are not limited to the following compounds:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols (polyols), such as ethylene glycol, diethylene glycol, triethylene glycol, tetraethylene glycol, propylene glycol, dipropylene glycol, the polyethylene glycols with average molecular weights of at least 200 and up to and including 5000 Daltons, the polypropylene glycols with average molecular weights of at least 200 and up to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol;

(3) polyoxygenated polyols and their derivatives such as glycerol, diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone;

(5) sulfur-containing compounds such as 2,2'-thiodiethanol, dimethyl sulfoxide and tetramethylene sulfone; and (6) water soluble N-oxides such as 4-methylmorpholine-N-oxides.

Useful humectants generally have melting points below the typical operating temperature of the intended printer system to avoid the formation of crystalline deposits on the printhead or in the maintenance system. Practically, this means that the useful humectants have melting points below 30° C. or even below 20° C.

The one or more humectants, such as triethylene glycol, can be present in an amount of at least 0.5 weight %, or at least 1 weight % and up to and including 10 weight %, or at least 3 weight % and up to and including 7 weight %, all based on the total weight of the aqueous green inkjet ink composition.

The aqueous green inkjet ink compositions of this invention can further comprise one or more anionic polyurethanes, each having an acid number of at least 50, or of at least 60 and up to and including 150, or even at least 55 and up to and including 90, which materials are described in more detail below.

Alternatively or in addition to the anionic polyurethanes, the aqueous green inkjet ink compositions can comprise one or more anionic acrylic or anionic styrene-acrylic polymers, each having an acid number of at least 50, or of at least 120 and up to and including 240, or even at least 160 and up to and including 220, which polymers are described in more detail below.

When both types of polymers are present, the weight ratio of the total weight of the one or more anionic polyurethanes to the total weight of the one or more anionic acrylic or styrene-acrylic polymers is from 1:9 and to and including 9:1, or more likely of from 1:3 and to and including 3:1. Moreover, the total cumulative amount (weight) of the one or more anionic polyurethanes and the one or more anionic acrylic or styrene-acrylic polymers can be less than or equal to 20 weight %, or at least 1 weight % and up to and including 10 weight %, all amounts being based on the total totals in the aqueous green inkjet ink composition.

Anionic polyurethanes that are useful in the present invention are condensation polymers prepared using suitable compounds ("monomers") having at least two hydroxyl groups (for example, diols or triols) and compounds ("monomers") having at least two isocyanates groups (such as diisocyanates and triisocyanates), which condensation polymers have suitable acidic groups to provide the desired acid number of the resulting polymer. The acidic groups are desirably carboxylic acid groups but any type of acidic group can be used if desired. Suitable compounds having sufficient hydroxyl groups and compounds having sufficient isocyanate groups are well known in the art, and any of these compounds can be substituted with one or more suitable acidic groups such as carboxylic acid groups. Not all of such compounds, however, need be substituted with the anionic groups.

The useful anionic polyurethanes can also comprise recurring units derived from monomers that do not contain acidic groups but can have multiple hydroxyl groups are often known as polyol or polyhydroxyl derivatives of polyethers, as described in U.S. Pat. No. 8,430,492 (Falkner et al.), the disclosure of which is incorporated herein by reference.

Particularly useful anionic polyurethanes contain a polyether diol unit and can be identified as polyether polyurethanes. Such anionic polyether polyurethanes generally can have a molecular weight ($M_w$) of at least 10,000 Daltons and up to and including 30,000 Daltons or at least 15,000 Daltons and up to and including 25,000 Daltons.

For example, particularly useful polyether polyurethanes are individually represented by the following Structure (I):

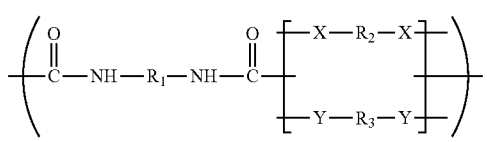

wherein $R_1$ is the central portion of recurring units derived from a polyisocyanate, $R_2$ represents a recurring unit derived from a polyether and having a molecular weight of at least 250 and up to and including 2900, $R_3$ represents a central portion of a recurring unit containing an acidic group, and X and Y can be the same or different and are oxygen or nitrogen as long as at least one of X and Y is oxygen.

For example, $R_1$ can be a divalent, substituted or unsubstituted hydrocarbon group including divalent hydrocarbon groups comprising 1 to 20 carbon atoms in the chain and one or more unsubstituted or substituted alicyclic, aliphatic, or aromatic groups, for example, substituted or unsubstituted 1,4-arylene-methylene-1,4-arylene, substituted or unsubstituted 1,4-cyclohexylene-methylene-1,4-cyclohexylene, substituted or unsubstituted n-hexylene, and substituted or unsubstituted 5-methyl-4,4-dimethyl-2,5-hexylene-methylene.

In Structure (I), $R_2$ can be a prepolymer comprising ethylene oxide, propylene oxide, tetramethylene oxide, or a mixture thereof that can be introduced into the polyurethane using any suitable polyol. For example, the polyether segment can be introduced into the polyurethane backbone by using a prepolymer with both ends terminated with a hydroxyl (diol) or an amino (diamine) group. Such prepolymers are known as polyols and polyamines. Useful polyether diols and diamines are sold under the tradenames TERATHANE® (Dupont) and JEFFAMINE®, for example the D, ED, and M series (Huntsman). Another useful polyether diamine is a polytetrahydrofuran bis(3-aminopropyl) terminated having a molecular weight of about 1,000. Mixtures of these various reactants can be used if desired.

In Structure (I), $R_3$ can be obtained from one or more polyols comprising phospho, carboxy, or sulfo groups, or a mixture of such groups. Polyols comprising carboxy groups include but are not limited to, 2,2'-bis(hydroxymethyl)propionic acid, 2,2'-bis(hydroxymethyl)butanoic acid, and hydroxyether of 2,4'-bis(1-hydroxyphenyl)valeric acid.

Useful water-soluble or water-dispersible anionic polyether polyurethanes can be prepared by preparing prepolymers having a relatively low molecular weight and small excess of isocyanate groups and chain-extending with a chain extender the prepolymers into high molecular weight polyurethane during the dispersion process as described for example in [0045]-[0049] of U.S. Patent Application Publication 2008/0207811 (Brust et al.) the disclosure of which is incorporated herein by reference.

The acidic groups in the anionic polyether polyurethanes useful in this invention can be at least partially and up to 100% neutralized (converted into salts) using monovalent inorganic bases such as alkaline metal hydroxides or organic amines such as dimethylethanolamine.

Anionic acrylic polymers and anionic styrene-acrylic polymers that are useful in the present invention are generally water-soluble or water-dispersible due to the presence of anionic groups distributed throughout the polymeric backbone. Such water-solubilizing anionic groups can include sulfonic acids and carboxylic acids. For these polymers, the term "water-soluble" is meant herein that when the anionic acrylic polymer or anionic styrene-acrylic polymer is dissolved in water and when such polymer is at least partially neutralized with an inorganic monovalent base or an organic amine base, the resultant solution is visually clear.

Ethylenically unsaturated polymerizable monomers ("monomers") useful for making useful anionic acrylic polymers include but are not limited to, methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, 2-hydroxypropyl methacrylate, acrylonitrile, methacrylonitrile, vinyl acetate, vinyl propionate, vinylidene chloride, vinyl chloride, butadiene, isoprene, N,N-dimethyl acrylamide, acrylic acid, methacrylic acid, chloromethacrylic acid, maleic acid, and derivatives thereof. Other useful ethylenically unsaturated polymerizable monomers include allyl compounds such as allyl esters, vinyl ethers, vinyl esters, vinyl heterocyclic compounds, sodium styrene sulfonate, crotonic acids, vinyl ketones, olefins, itaconic acids and esters, and many other compounds that are described in [0055] of U.S. Patent Application Publication 2008/0207811 (noted above). The anionic acrylic polymers can comprise recurring units derived from the one or more of the noted monomers that are arranged in blocks or in random fashion along the polymer backbone.

In particular, the anionic styrene-acrylic polymers can be derived from at least one or more acrylic monomers (as described above) and at least one or more styrene monomers (including styrene and derivatives thereof) in blocks of the same recurring units or randomly occurring recurring units.

The anionic acrylic polymers and styrene-acrylic polymers can have a weight average molecular weight ($M_w$) of at least 1,000 Daltons up to and including 100,000 Daltons or typically of at least 1,000 Daltons and up to and including 50,000 Daltons.

The anionic acrylic polymers and anionic styrene-acrylic polymers can be prepared using emulsion polymerization, solution polymerization, or bulk polymerization techniques that are well known in the art. In addition, the acidic groups in such polymers can be at least partially neutralized in a manner like neutralization of the anionic polyether polyurethanes described above.

Representative anionic acrylic polymers and anionic styrene-acrylic polymers useful in the present invention are described for example in [0061] of U.S. Patent Application Publication 2008/207811 (noted above). Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.).

In addition, modified polysiloxanes can be present in the aqueous green inkjet ink compositions. Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. Non-silicone surfactants can also be used, including but not limited to anionic, cationic, nonionic, or amphoteric surfactants such as those commercially available as SURFYNOL® surfactants (Air Products) including SURFYNOL® 440 and 465 alkynediol surfactants.

Colorless fluorescent colorants (dyes or pigments) can also be present in the aqueous green inkjet ink compositions and examples of such compounds are described in U.S. Patent Application Publication 2014/231674 (Cook), the disclosure of which is incorporated herein by reference.

Other additives that can be present in the aqueous green inkjet ink compositions, in amounts that would be readily apparent to one skilled in the art, include but are not limited to, thickeners, conductivity-enhancing agents, drying agents, waterfast agents, viscosity modifiers, pH buffers, antifoamants, wetting agents, corrosion inhibitors, biocides, fungicides, defoamers (such as SURFYNOL® DF110L, PC, MD-20, and DF-70), UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.).

Water is generally present in the aqueous green inkjet ink compositions in an amount of at least 75 weight % or at least 80 weight %, and generally at no more than 90 weight %.

The pH of the aqueous green inkjet ink compositions of the present invention can be adjusted if desired to at least 8 and up to and including 12, or more likely of at least 8 and up to and including 10, or in some embodiments of at least 8 and up to and including 9.5. The pH can be achieved using any suitable base such as a hydroxide or an organic amine in a suitable amount. Buffers can be included to maintain the desired pH as would be readily apparent to one skilled in the art, according to Cols. 17-19 of U.S. Pat. No. 8,455,570 (Lindstrom et al.).

Ink Sets

The aqueous green inkjet ink compositions used in the present invention can be provided as part of an ink set. Such ink sets can include one or more additional aqueous color inkjet ink compositions, each of which comprises at least one visible colorant (described below) to provide a color or hue other than green. For example, each ink set can include for example, one or more additional aqueous color inkjet ink compositions chosen from an aqueous cyan inkjet ink composition, an aqueous magenta inkjet ink composition, an aqueous yellow inkjet ink composition, and an aqueous black inkjet ink composition. Other useful aqueous color inkjet ink compositions can have different hues or "colors" such as orange, red, violet, and blue and thus contain one or more suitable aqueous soluble or aqueous-dispersible dyes or pigments suitable to provide the desired hue. Aqueous white inkjet ink compositions are also useful in certain situations and can be included in an ink set.

The aqueous green inkjet ink compositions of the present invention can be used to advantage in such ink sets as described above to provide expanded color gamut.

Each of the additional aqueous color inkjet ink compositions that can be included in such ink sets can be provided with the various materials that are known to be combined for this purpose, including surfactants, humectants or co-solvents, polymers (include core-shell polymers as described in Col. 13, lines 26-39 of U.S. Pat. No. 8,455,570, noted above), biocides, thickeners, non-colored particles, and other materials that are described above as addenda for the aqueous green inkjet ink compositions.

In addition, the additional aqueous color inkjet ink compositions typically comprise one or more colorants (such as dyes or pigments other than the organic green pigments described above) that will provide the desired color or hue. Pigment colorants are particularly useful, and they can be present individually or in mixtures in each additional aqueous color inkjet ink composition.

A wide variety of organic and inorganic pigments can be used individually or in combination. For example, a carbon black pigment can be combined with a colored pigment such as a cyan copper phthalocyanine or a magenta quinacridone pigment. Useful pigments are described for example in U.S. Pat. No. 5,026,427 (Mitchell et al.), U.S. Pat. No. 5,141,556 (Matrick), U.S. Pat. No. 5,160,370 (Suga et al.), and U.S. Pat. No. 5,169,436 (Matrick), the disclosures of all of which are incorporated herein by reference.

Useful pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific useful pigment colorants are described in Col. 10 (lines 66) to Col. 11 (line 40) of U.S. Pat. No. 8,455,570 (noted above), the disclosure of which is incorporated herein by reference.

The useful pigment colorants can be accompanied by suitable polymeric or non-polymeric dispersants that are well known in the art (as described above), or the pigment colorants can be self-dispersing and thus dispersible and stable in the additional aqueous color inkjet ink compositions without the use of dispersants because of the presence of appropriate surface groups. Examples of useful self-dispersing pigment colorants are described in Col. 11 (lines 49-53) of U.S. Pat. No. 8,455,570 (noted above).

Useful pigment colorants can have a median particle diameter of less than 150 nm and more likely less than 100 nm or even less than 50 nm. As useful herein, the term "median particle diameter" refers to the $50^{th}$ percentile of the classified particle size distribution such that 50% of the volume of the particles is provided by particles having diameters smaller than the indicated diameter. A laser light scattering device, as described above, can be used to measure the particle size distributions.

Organic pigment colorants can be present in each additional aqueous color inkjet ink compositions in an amount of at least 0.1 weight % and up to and including 30 weight %, or more likely of at least 1 weight % and up to and including 10 weight %, or even at least 1 weight % and up to and including 8 weight %, based on the total weight of the additional aqueous color inkjet ink composition.

In addition or alternatively to the pigment colorants, the additional aqueous color inkjet ink compositions can include one or more aqueous-soluble dyes that are well known in the art, for example as described in Col. 12 (lines 4-55) of U.S. Pat. No. 8,455,570 (noted above).

The additional aqueous color inkjet ink compositions in the ink sets can desirably include one or more water-soluble or water-dispersible acrylate polymers and co-polymers and polyurethanes, or mixtures thereof, as dispersants for such aqueous compositions.

Each of the additional aqueous color inkjet ink compositions can have a desirable pH of at least 8 and up to and including 10, or at least 8 and up to and including 9.5, as described above for the aqueous colorless inkjet ink compositions, using suitable bases and buffer systems.

In addition, each additional aqueous color inkjet ink composition can have suitable viscosity of at least 1 centipose (0.001 N-sec) but less than 3 centipoise (0.003 N-sec) as measured at 25° C. using a suitable viscometer.

Each additional aqueous color inkjet ink composition described herein can be prepared by dispersing suitable organic pigments (if present) in water, and mixing the organic pigments and other noted materials in suitable amounts.

Methods of Inkjet Printing

The present invention can be practiced by providing a suitable substrate (described below), and ink jetting an aqueous green inkjet ink composition described herein as spaced green drops to provide a green color ink jetted image on the substrate using any suitable ink jetting equipment.

Thus, the green color ink jetted image can be provided by inkjet printing the aqueous green inkjet ink composition, with or without additional aqueous color inkjet ink compositions using thermal or piezoelectric drop-on-demand (DOD) printheads or continuous (CIJ) printheads. Each type of printhead and apparatus attached thereto require specific properties in the aqueous green inkjet ink compositions in order to achieve reliable and accurate jetting of each aqueous color inkjet ink composition.

For example, some embodiments of the method of this invention for continuous inkjet printing, using a continuous inkjet printing apparatus, can comprise:

providing a suitable substrate having a predetermined area for imaging, ink jetting an aqueous green inkjet ink composition (as described herein) from a main fluid supply as a continuous stream that is broken into both spaced green drops and non-printing green drops, and collecting and returning the non-printing green drops to the main fluid supply.

For example, in many embodiments, the aqueous green inkjet ink composition and one or more additional aqueous color inkjet ink compositions have dedicated delivery channels to avoid having oppositely charged materials in the multiple inkjet ink compositions interact until they come into reactive association on the intended substrate. The aqueous green inkjet ink composition can be applied (ink jetted) either in the same pass in-line with the one that provides the one or more additional aqueous color inkjet ink compositions, or in a separate pass. The aqueous green inkjet ink composition can be applied either under one or more other aqueous color inkjet ink compositions, or it can be applied over one or more, or even all, of the aqueous color inkjet ink compositions.

In addition, the method can include:

delivering an aqueous green inkjet ink composition to a first drop generator mechanism, ejecting the aqueous green inkjet ink composition from a first drop generator mechanism as spaced green drops in a controlled manner to provide the green color image on the substrate;

delivering at least one additional aqueous color inkjet ink composition to a second drop generator mechanism, which at least one additional color inkjet ink composition comprises a colorant that is not a green colorant, and ejecting the at least one additional aqueous color inkjet ink composition from a different drop generator mechanism as spaced additional color drops in a controlled manner to provide at least one additional color image on the substrate.

Each colored image can also be carried out as part of a CIJ method of this invention as comprising:

delivering each additional aqueous color inkjet ink composition from a first main fluid supply as a continuous stream that is broken into both the spaced color drops and non-printing color drops;

collecting and returning the non-printing color drops to the first main fluid supply;

delivering the aqueous green inkjet ink composition from a different main fluid supply as a continuous stream that is broken into both the spaced green drops and non-printing green drops; and collecting and returning the non-printing green drops to the different main fluid supply.

For some continuous inkjet (CIJ) methods, the aqueous green inkjet ink composition, ink jetting can be carried out at a suitable drop generation frequency of at least 350 kHz with a near nozzle velocity of at least 15 m/sec. More likely, the drop generation frequency is at least 350 kHz and up to and including 1000 kHz at a near nozzle velocity of at least 15 m/sec and up to and including 25 m/sec.

The aqueous green inkjet ink composition and any of the additional aqueous color inkjet ink compositions can be positioned in any one of the printhead ports intended for use in the present invention. The printhead containing the aqueous green inkjet ink composition can be positioned on the same carriage assembly as the one used for the additional aqueous color inkjet ink compositions, or it can be positioned on a separate carriage assembly.

The method can be carried out to provide a suitable green inkjet ink image on a suitable substrate (also known in the art as "receiver" or "receiver element"). Any individual substrate will have what would be understood as a total "printable" area onto which an aqueous inkjet ink composition can be ink jetted using suitable equipment and processes. The present invention can be carried out to apply one or more additional aqueous color inkjet ink composition and an aqueous green inkjet ink composition over a predetermined or areal percentage of the total printable area.

For example, suitable substrates can include but are not limited to, photoglossy receivers or plain paper receivers such as bright white inkjet papers that are commercially available from a number of commercial sources (as described for example, in Col. 13, lines 28-34) of U.S. Pat. No. 8,187,371 (noted above). The photoglossy receivers (also known as swellable media or microporous media) can be manufactured with a coated layer on an underlying paper support and are also useful for providing photographic quality inkjet printed images. Some details of such substrates are provided in Col. 13 (lines 37-51) of U.S. Pat. No. 8,187,371 (noted above). Plain papers can be treated with multivalent salts during or after manufacture as is well known in the art. Other useful substrates are described in U.S. Pat. No. 6,045,917 (Missell et al.), U.S. Pat. No. 5,605,750 (Romano et al.), U.S. Pat. No. 5,723,211 (Romano et al.), and U.S. Pat. No. 5,789,070 (Shaw-Klein et al.).

Useful paper substrates include plain bond papers, surface-treated papers, coated or calendared business gloss papers, resin-coated papers, laminated substrates comprising both paper layers and polymeric film layers such as polyester film layers, and heavy stock papers. It is also possible to use fabrics, cardboard, plastic films (such as polyester films), microporous materials, and any other substrate material known in the art. Thus, the substrate can be transparent, translucent, or opaque. The substrate can be in the form of a rigid or semi-rigid sheet or a wound roll.

The durability and other properties of ink jetted printed green and additional ink jetted color images provided according to this invention can be improved by using substrates that have been pretreated with a composition to enhance the quality of the inkjet printed images. This pretreatment is typically done prior to incorporation of the substrate into the inkjet printing apparatus (such as a continuous inkjet printing apparatus), but in some instances, the substrate can be pretreated within the apparatus before application of the aqueous green inkjet ink composition. One or both supporting surfaces (planar sides) of a substrate can be pretreated, or one supporting surface can be pretreated and the opposite supporting surface left untreated.

A substrate can be pretreated with a pretreatment composition comprising a water-soluble multivalent metal ion salt, such as but not limited to, a salt comprising one or more multivalent cations including calcium, magnesium, barium, zinc, and aluminum cations, with calcium and magnesium cations being particularly useful. Examples of useful multivalent metal cation salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal cation salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference.

A resulting printed substrate (or printed receiver element) can be any suitable article, including but not limited to, documents, paper currency, postage stamps, various packaging materials, fabrics, polymeric films or sheets, label for clothing, perfume and wine bottles labels, lottery tickets, passports, drivers licenses, and other articles or papers that would be readily apparent to one skilled in the art using the teaching provided herein.

One sub-system common to most CIJ apparatus and methods and to some of the more recent DOD printing systems, is a recirculating fluid system, which constantly recirculates an aqueous green inkjet ink composition. For the aqueous green and additional color inkjet ink compositions used in the method of this invention, the median particle size of the color pigments and the overall stability of the color pigment particle dispersion, are critical features due to the potentially abrasive nature of color pigment particle dispersions. Larger particles or less stable particle dispersions are more prone to cause premature wear or failure of the components of the inkjet printing system and fluid sub-system.

In some embodiments of the present invention, the aqueous green inkjet printer ink composition is printed by employing a plurality of drop volumes (or drop size) formed from the continuous fluid stream, with non-printing drops of a different volume than printing drops being diverted by a drop deflection means into a gutter for recirculation, as disclosed for example in U.S. Pat. No. 6,588,888 (noted above), U.S. Pat. No. 6,554,410 (Jeanmaire et al.), U.S. Pat. No. 6,682,182 (Jeanmaire et al.), U.S. Pat. No. 6,793,328 (Jeanmaire), U.S. Pat. No. 6,517,197 (Hawkins et al.), U.S. Pat. No. 6,866,370 (Jeanmaire), and U.S. Pat. No. 6,575,566 (Jeanmaire et al.), U.S. Patent Application Publication 2003/0202054 (Jeanmaire et al.) the disclosures of all of which are incorporated herein by reference.

In other embodiments, the aqueous green inkjet ink composition is printed onto at least part of a suitable substrate using an apparatus capable of controlling the direction of the formed printing and non-printing drops by asymmetric application of heat to the continuous stream of the aqueous green inkjet ink composition that initializes drop break-up and serves to steer the resultant drops, as disclosed for example in U.S. Pat. No. 6,079,821 (Chwalek et al.) and U.S. Pat. No. 6,505,921 (Chwalek et al.), the disclosures of both of which are herein incorporated by reference. Useful agitation of the aqueous green inkjet ink composition, heated main fluid supply, and inkjet printhead and composition filtration means for CIJ ink compositions are described for example in U.S. Pat. No. 6,817,705 (Crockett et al.), the disclosure of which is incorporated herein by reference. Printer replenishing systems for maintaining quality of the aqueous green inkjet ink composition and to counter the effects of volatile component evaporation are described in U.S. Pat. No. 5,526,026 (Bowers) and U.S. Pat. No. 5,473,350 (Mader et al.), the disclosures of which are incorporated herein by reference, and in EP 0 597 628 A1 (Loyd et al.).

It can be useful to regularly replenish the main fluid supply with additional the aqueous green inkjet ink composition described herein to keep the reservoir at the desired level during inkjet printing. Alternatively, water can be added to the main fluid supply to compensate for evaporation during inkjet printing. A skilled worker in the art would understand how to accomplish these operations using the teaching provided in the art noted above.

At least the following embodiments and combinations thereof are described herein, but other combinations of features are considered to be within the present invention as a skilled artisan would appreciate from the teaching of this disclosure:

1. An aqueous organic pigment dispersion comprising:
    a green copper phthalocyanine pigment,
    an azo-coupled β-ketoamide pigment, and
    at least one organic pigment dispersant in an amount of at least 40 weight % and up to and including 100 weight %, based on the sum of the weights of the green copper phthalocyanine pigment and the azo-coupled β-ketoamide pigment,
    wherein:
    the weight ratio of the green copper phthalocyanine pigment to the azo-coupled β-ketoamide pigment is from 1:1 to and including 10:1, and
    the median particle diameter of each of the green copper phthalocyanine pigment and the azo-coupled β-ketoamide pigment is less than 85 nm and at least 95% of the total particles of each of the green copper phthalocyanine pigment and the azo-coupled β-ketoamide pigment have a particle diameter of less than 150 nm when measured in intensity mode using a laser light scattering particle size analyzer.

2. The aqueous organic pigment dispersion of embodiment 1, wherein the weight ratio of the green copper phthalocyanine pigment to the azo-coupled β-ketoamide pigment is from 3:1 to and including 6:1.

3. The aqueous organic pigment dispersion of embodiment 1 or 2, wherein the at least one organic pigment dispersant is present in an amount of at least 60 weight % and up to and including 75 weight %, based on the sum of the weights of the green copper phthalocyanine pigment and the azo-coupled β-ketoamide pigment.

4. The aqueous organic pigment dispersion of any of embodiments 1 to 3, exhibiting CIELAB color characteristics of a* of at least −80 and up to and including −20, b* of at least 20 and up to and including 80, and L* of at least 20 and up to and including 90.

5. The aqueous organic pigment dispersion of any of embodiments 1 to 4, wherein the organic pigment dispersant is an anionic benzyl methacrylate copolymer.

6. The aqueous organic pigment dispersion of any of embodiments 1 to 5, wherein the azo-coupled β-ketoamide pigment is a yellow mono-azo-coupled β-ketoamide pigment.

7. The aqueous organic pigment dispersion of any of embodiments 1 to 6, wherein the green copper phthalocyanine pigment is a halogenated green copper phthalocyanine pigment.

8. The aqueous organic pigment dispersion of any of embodiments 1 to 7, wherein the green copper phthalocyanine pigment is C.I. Pigment Green 7 and the azo-coupled β-ketoamide pigment is Pigment Yellow 74.

9. The aqueous organic pigment dispersion of any of embodiments 1 to 8, wherein the green copper phthalocyanine pigment is present in an amount of at least 4 weight % and up to and including 15 weight %, based on the total weight of the aqueous organic pigment dispersion.

10. An aqueous green inkjet ink composition comprising:
the aqueous organic pigment dispersion of any of embodiments 1 to 9, and
at least one humectant,
the aqueous green inkjet ink composition having a viscosity of less than 3 centipoise (0.003 N-sec) at 25° C.

11. The aqueous green inkjet ink composition of embodiment 10 further comprising an anionic polyurethane having an acid number of at least 50 or an anionic acrylic or anionic styrene-acrylic polymer, or both the anionic polyether polyurethane and the anionic acrylic or anionic styrene-acrylic polymer.

12. The aqueous green inkjet ink composition of embodiment 10 or 11, exhibiting CIELAB color characteristics of a* of at least −80 and up to and including −20, b* of at least 20 and up to and including 80, and L* of at least 20 and up to and including 90.

13. The aqueous green inkjet ink composition of any of embodiments 10 to 12, wherein the green copper phthalocyanine pigment is present in an amount of at least 1 weight % and up to and including 5 weight %, based on the total weight of the aqueous green inkjet ink composition.

14. An ink set comprising at least the following individual inks:
the aqueous green inkjet ink composition of any of embodiments 10 to 13; and
one or more additional aqueous color inkjet ink compositions, each comprising at least one colorant that is not a green colorant.

15. The ink set of embodiment 14, wherein the one or more aqueous additional color inkjet ink compositions comprises at least one of following aqueous inkjet ink compositions:
an aqueous cyan inkjet ink composition,
an aqueous magenta inkjet ink composition,
an aqueous yellow inkjet ink composition, or
an aqueous black inkjet ink composition.

16. A method of making the aqueous organic pigment dispersion of any of embodiments 1 to 9, comprising:
mixing a green copper phthalocyanine pigment with an azo-coupled β-ketoamide pigment and at least one organic pigment dispersant such that the weight ratio of the green copper phthalocyanine pigment to the azo-coupled β-ketoamide pigment is from 1:1 to and including 10:1, and the median particle diameter of each of the green copper phthalocyanine pigment and the azo-coupled β-ketoamide pigment is less than 85 nm and at least 95% of the total particles of each of the green copper phthalocyanine pigment and the azo-coupled β-ketoamide pigment have a particle diameter of less than 150 nm, when measured in intensity mode using a laser light scattering particle size analyzer.

17. A method of making an aqueous green inkjet ink composition of any of embodiments 10 to 13, comprising:
forming the aqueous organic pigment dispersion of any of embodiments 1 to 9, and
combining at least one humectant and the aqueous organic pigment dispersion such that the aqueous green inkjet ink composition has a viscosity of less than 3 centipoise (0.003 N-sec) at 25° C.

18. The method of embodiment 17, further combining the at least one humectant and the aqueous organic pigment dispersion with an anionic polyurethane having an acid number of at least 50 or an anionic acrylic or anionic styrene-acrylic polymer, or both the anionic polyether polyurethane and the anionic acrylic or anionic styrene-acrylic polymer.

19. A method of inkjet printing, comprising:
providing a substrate,
ink jetting the aqueous green inkjet ink composition of any of embodiments 10 to 13 as spaced green drops to provide a green color image on the substrate.

20. The method of embodiment 19, comprising:
ink jetting the aqueous green inkjet ink composition from a main fluid supply as a continuous stream that is broken into both the spaced green drops and non-printing green drops; and
collecting and returning the non-printing green drops to the main fluid supply.

21. The method of embodiment 19 or 20, wherein the aqueous green inkjet ink composition is provided as spaced green drops and non-printing green drops using a continuous inkjet printing apparatus.

22. The method of embodiment 21, comprising:
delivering an aqueous green inkjet ink composition to a first drop generator mechanism,
ejecting the aqueous green inkjet ink composition from the first drop generator mechanism as spaced green drops in a controlled manner to provide a green color image on the substrate;
delivering an additional aqueous color inkjet ink composition to a second drop generator mechanism, which additional aqueous color inkjet ink composition comprises a colorant that is not a green colorant, and
ejecting the additional aqueous color inkjet ink composition from the second drop generator mechanism as spaced additional color drops in a controlled manner to provide an additional color image on the substrate.

23. The method of embodiment 22, comprising:
delivering the additional aqueous color inkjet ink composition from an additional main fluid supply as a continuous stream that is broken into both the spaced additional color drops and additional non-printing color drops;
collecting and returning the additional non-printing color drops to the additional main fluid supply.

24. The method of any of embodiments 19 to 23, comprising ink jetting the aqueous green color inkjet ink composition at a frequency of at least 350 kHz with a near nozzle velocity of at least 15 m/sec.

25. The method of any of embodiments 19 to 24, wherein the aqueous green color inkjet ink composition has a viscosity of less than or equal to 2 centipoise (0.002 N-sec) at 25° C.

The following Examples are provided to illustrate the practice of this invention and are not meant to be limiting in any manner.

Invention Example 1

Aqueous Organic Pigment Dispersion 1

An aqueous organic pigment dispersion was prepared according to the present invention in the following manner:

To a double-walled stainless steel mixing vessel containing four baffles, were added 374 g of water and 924 g of a 15 weight % solution of potassium-neutralized organic pigment dispersant that was a terpolymer (Polymer P-1) derived by emulsion polymerization of benzyl methacrylate, stearyl methacrylate, and methacrylic acid at a feed weight ratio of 37:30:33 and having an $M_w$ of 8,700. A nominal 6-inch (15.2 cm) ring-style disperser impeller (Hockmeyer Equipment Corporation, D-Blade) driven by a Hockmeyer Model HBI-7.5-11-99 High Shear Mixer was centered 3 inches (7.62 cm) above the bottom of the mixing vessel and stirring was initiated.

C.I. Pigment Yellow 74 (a monoazo-coupled β-ketoamide yellow pigment with 3 weight % of an anionic stabilizer, obtained from Sun Chemical) (41.84 g) and C.I. Pigment Green 7 (Sun Chemical) (156.2 g) were added sequentially and slowly added to the mixing vessel. Milling media comprising crosslinked polystyrene beads (derived from styrene, divinyl benzene, and ethyl vinyl benzene) having an average particle diameter of 50 μm (1320 g) was added slowly while increasing the impeller speed. The mixture in the mixing vessel was milled with an impeller blade tip speed of about 20 meter/second for about 20 hours at an internal temperature of 25-30° C. The resulting dispersion was further diluted with water (473.6 g) and Kordek™ MLX biocide (Rohm & Haas) (10 g) to provide a final total organic pigment concentration of about 10 weight % and a final Polymer P-1 concentration of about 7 weight %. The impeller was removed and the milling media was filtered off. A final filtration through a 0.3 μm Pall Corporation Profile II® depth filter yield about 1980 g of aqueous organic pigment dispersion according to the present invention. The pigment dispersion thus obtained had a 50% Intensity mode particle size of 64 nm and a 95% Intensity mode particle size of 115 nm as characterized by Nanotrac Auto Sampler NAS35 (Nanotrac Inc., Nanotrac Brand).

Invention Example 2

Aqueous Organic Pigment Dispersion 2

An aqueous organic pigment dispersion was prepared according to the present invention similar to aqueous organic pigment Dispersion 1 above where the monoazo-coupled β-ketoamide yellow pigment (from Clariant Corporation) (41.84 g) containing no anionic stabilizer and C.I. Pigment Green 7 (Sun Chemical) (156.2 g) were incorporated. The resulting Dispersion 2 had a 50% Intensity mode particle size of 69 μm and a 95% Intensity mode particle size of 121 μm as characterized using a Nanotrac Auto Sampler NAS35 (Nanotrac Inc., Nanotrac Brand).

Invention Example 3

Aqueous Organic Pigment Dispersion 3

An aqueous organic pigment dispersion was prepared according to the present invention similar to aqueous organic pigment Dispersion 1 above with a different organic pigment weight ratio, that is, where the monoazo-coupled β-ketoamide yellow pigment (from Sun Chemical) (36.04 g) and C.I. Pigment Green 7 (Sun Chemical) (161.96 g) were incorporated. The resulting Dispersion 2 had a 50% Intensity mode particle size of 68 μm and a 95% Intensity mode particle size of 127 μm as characterized using a Nanotrac Auto Sampler NAS35 (Nanotrac Inc., Nanotrac Brand).

Comparative Example 1

Aqueous Organic Pigment Dispersion 4

An aqueous organic pigment dispersion that is outside the scope of the present invention was prepared similar to Invention Example 1 except that the yellow mono-coupled β-ketoamide organic pigment was omitted. C.I. Pigment Green 7 was provided at 198.04 g. The particle size of the organic pigment was monitored using a Nanotrac Auto Sampler NAS35. The milling process was stopped at 18 hours when the particle size was no longer reduced and an increase in particle size was observed instead. The resulting green pigment (50%) Intensity mode particle size in the aqueous organic pigment dispersion was 92 nm and the 95% Intensity mode particle size was 244 nm as characterized using the same Nanotrac Auto Sampler NAS35 equipment. In order for this aqueous organic pigment dispersion to be used in a CIJ inkjet process, continuous recirculation filtration through a 0.2 μm nylon filter was required for 12 hours to remove over-sized particles and to achieve an improved dispersion particle size (95% intensity mode) of 160 nm.

Comparative Example 2A

Aqueous Organic Pigment Dispersion 5

An aqueous organic pigment dispersion that is outside the scope of the present invention was prepared similar to Invention Example 1 except that the C.I. Pigment Green 7 was omitted and the monoazo-coupled β-ketoamide yellow pigment (with 3 weight % stabilizer from Sun Chemical Co.) was provided at 198.04 g. The particle size of the organic pigment was monitored using a Nanotrac Auto Sampler NAS35. The resulting yellow pigment 50% Intensity mode particle size in the aqueous organic pigment dispersion was 80 nm and the 95% Intensity mode particle size was 130 nm as characterized using the same Nanotrac Auto Sampler NAS35 equipment. The UV spectrum of the resulting organic dispersion had a single major absorption peak with a $\lambda_{max}$ of 437 nm, which is typical of a yellow pigment dispersion not a green pigment dispersion. Thus, this aqueous organic pigment dispersion is not acceptable for use in the present invention because it is the wrong "color".

Comparative Example 2B

Aqueous Organic Pigment Dispersion 6

An aqueous organic pigment dispersion that is outside the scope of the present invention was prepared similarly to Invention Example 1 except that the C.I. Pigment Green 7 was omitted and the monoazo-coupled β-ketoamide yellow pigment (without stabilizer) was provided at 198.04 g. The particle size of the organic pigment was monitored using a Nanotrac Auto Sampler NAS35. The milling process was stopped at 18 hours when the particle size was no longer reduced and an increase in particle size was observed instead. The resulting yellow pigment 50% Intensity mode particle size in the aqueous organic pigment dispersion was 80 nm and the 95% Intensity mode particle size was 130 nm as characterized using the same Nanotrac Auto Sampler NAS35 equipment. Within 24 hours, the yellow pigment particle size had increased via agglomeration to a size that is useless for CIJ inkjet printing.

FIG. 1 shows the effect of milling time (hours) on particle size (95% Intensity mode in μm) for each of Dispersions 1 to 4 described above (Invention Examples 1-3 and Comparative Example 1, respectively). As can be observed from the illustrated data, Dispersions 1 to 3 (Invention Examples 1-3) that were prepared according to the present invention exhibited a reduced particle size at about 20 hours of milling, and such resulting aqueous organic pigment dispersions are useful in the methods of the present invention including CIJ inkjet printing methods. However, the Comparative Example 1 Dispersion 4 that did not contain the desired yellow organic pigment showed an initial decrease in particle size for up to 10 hours of milling, but as milling time was increased more than 12 hours, the particle size increased significantly and was unacceptable for CIJ inkjet printing methods.

Dispersion 5 was not evaluated in this manner as it can be seen that the particle size was acceptable, but as noted above, such an aqueous organic pigment dispersion is deficient in that it cannot be used to provide an expanded color gamut, especially in combination with other aqueous color inkjet ink compositions.

Likewise, Dispersion 6 was not evaluated in this manner for the reasons noted above and additionally, because of a lack of particle stability (particle agglomeration).

Invention Examples 4-8

Aqueous Green Inkjet Ink Compositions

Several aqueous green inkjet ink compositions were prepared according to the present invention using the aqueous organic pigment dispersions, Invention Examples 1-3, described above at various concentrations of organic pigments (based on total composition weight) as shown in TABLE I below, and combining them (physically mixing) with the components described below. Each resulting aqueous green inkjet ink composition was filtered through a 45 mm, 0.2 μm nylon filter disk.

Each of the aqueous green inkjet ink compositions also comprised 5 weight % of a triethylene glycol humectant, 0.2 weight % of SURFYNOL® 440 surfactant, 0.1 weight % of SURFYNOL® DF110L defoamer, 0.1 weight % of Corbratec TT50S anticorrosion agent, 0.03 weight % of Proxel GXL biocide, 1 weight % of Polymer 1 (polyurethane prepared as described in U.S. Pat. No. 8,430,492 (noted above), and 1 weight % of Polymer 2 (acrylic polymer purchased as JONCRYL® HPD696 from BASF), all amounts based on the total composition weight.

Comparative Examples 3-5

Aqueous Green Inkjet Ink Compositions

Three aqueous green inkjet ink compositions outside of the present invention were prepared using the Comparative Examples 1 and 2A dispersions described above in amounts shown in TABLE I below, based on total composition weight.

Each of the aqueous green inkjet ink compositions also comprised 5 weight % of a triethylene glycol humectant, 0.2 weight % of SURFYNOL® 440 surfactant, 0.1 weight % of SURFYNOL® DF110L defoamer, 0.1 weight % of Corbratec TT50S anticorrosion agent, 0.03 weight % of Proxel GXL biocide, 1 weight % of Polymer 1 (polyurethane prepared as described in Invention Examples 4-8, and 1 weight % of Polymer 2 (acrylic polymer purchased as JONCRYL® HPD696 from BASF), all amounts based on the total composition weight.

TABLE I

| Dispersion | Invention Example 4 | Invention Example 5 | Invention Example 6 | Invention Example 7 | Invention Example 8 | Comparative Example 3 | Comparative Example 4 | Comparative Example 5 |
|---|---|---|---|---|---|---|---|---|
| Invention Example 1 | 2.50% | 3.00% | 3.50% | 0 | 0 | 0 | 0 | 0 |
| Invention Example 2 | 0 | 0 | 0 | 3.00% | 0 | 0 | 0 | 0 |
| Invention Example 3 | 0 | 0 | 0 | 0 | 3.00% | 0 | 0 | 0 |
| Comparative Example 1 | 0 | 0 | 0 | 0 | 0 | 2.37% | 3.00% | 1.97% |
| Comparative Example 2A | 0 | 0 | 0 | 0 | 0 | 0.63% | 0 | 0.53% |

Figure 2:
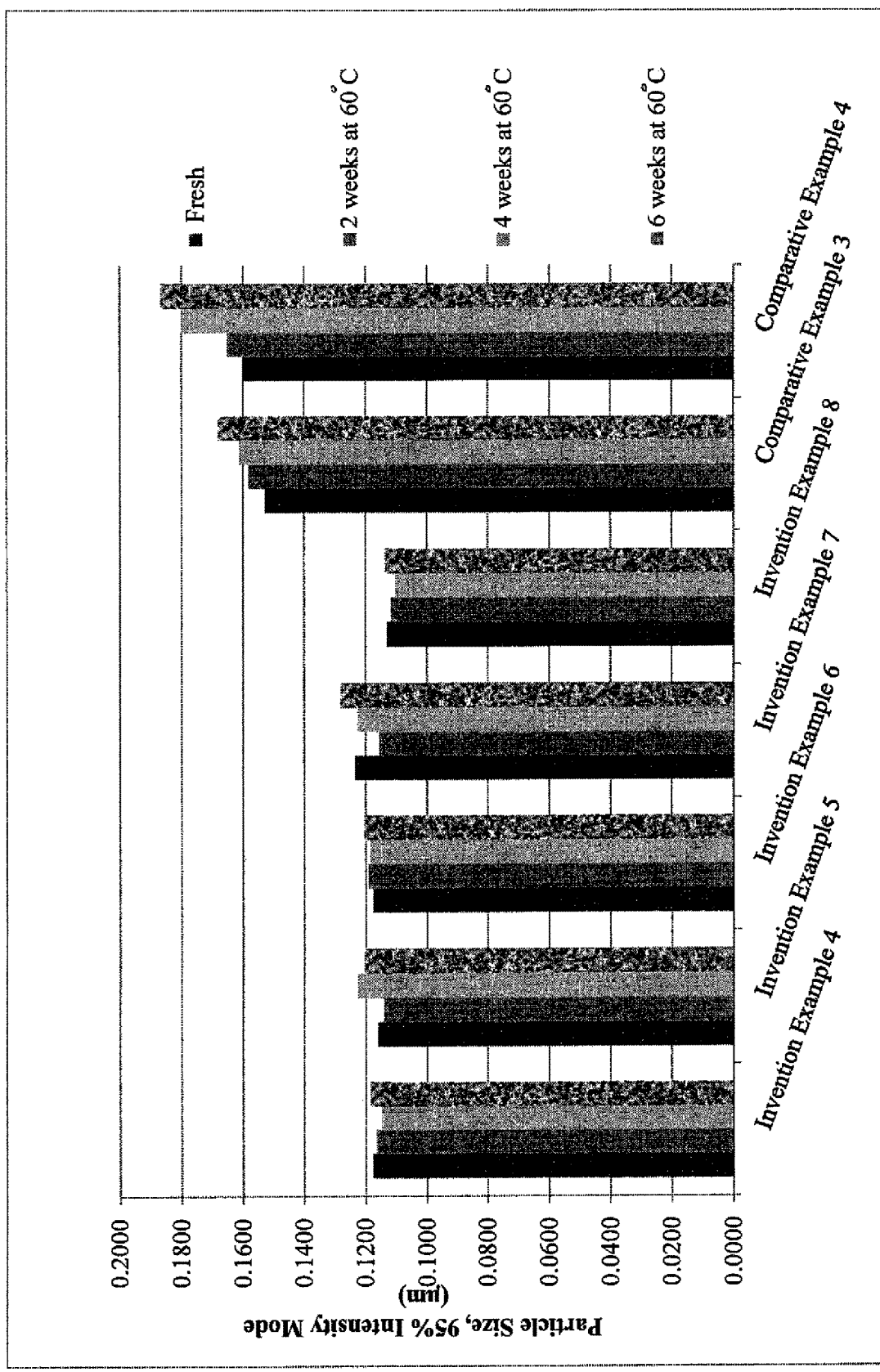
FIG. 2 is a bar graph representing particle size (95% intensity mode in μm) under Fresh and various thermal treatment conditions (certain number of weeks at 60° C.) for various working examples as described below.

All of the aqueous green inkjet ink compositions described in TABLE I had green pigment particles of acceptable size and were suitably used in inkjet printing methods. However, most of the aqueous green inkjet ink compositions was subjected to thermal stability tests that are indicative of pigment particle stability, and showing whether green pigment particles stay of acceptable particle size at 95% intensity mode or whether they agglomerate. FIG. 2 shows the particle size measurements (95% Intensity mode in μm) for Invention Examples 4-8 and Comparative Examples 3 and 4 under four composition test conditions: Fresh; 2 weeks at 60° C.; 4 weeks at 60° C.; and 6 weeks at 60° C.

As can be observed from the data in the bar graph of FIG. 2, the aqueous green inkjet ink compositions of Invention Examples 4-8 according to the present invention had initial (Fresh) small particle size and did not appreciably agglomerate during each of the three elevated thermal stability tests at 60° C. However, unacceptable "fresh" particle size was observed for Comparative Examples 3 and 4, and each of these compositions also exhibited particle size growth during each of the three elevated thermal stability tests.

A commercial continuous inkjet (CIJ) process is used to provide inkjet printing by thermally stimulating inks and producing large and small drops. The small drops are air-deflected back to the main fluid supply (ink tank) but the large drops are not deflected and are thus directed to a substrate where an inkjet image is formed. Ink drops of differing mass have different velocities and thus small drops can merge into large drops as they travel away from the nozzle. These merged drops are too large to be deflected and can land on paper creating an undesirable "pepper spray" effect (unwanted and mis-directed drops sprayed on the substrate). The small drop merger ("SDM/sec") effect is directly related to pigment particle size, and thus smaller, uniformly milled organic pigment dispersions are desirable to avoid the "pepper spray" problem.

Figure 3:
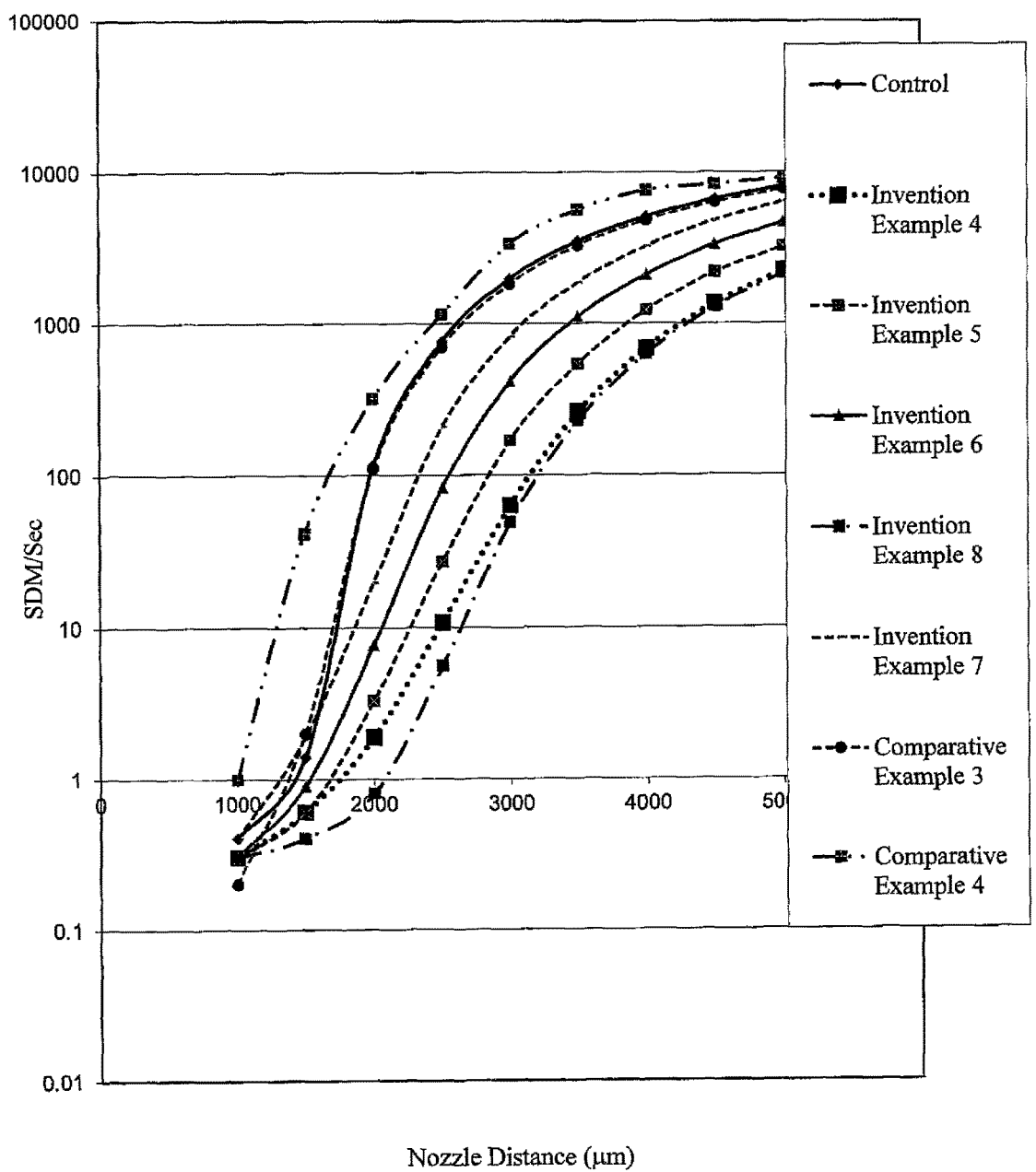
FIG. 3 is a graphical representation of small drop mergers (SDM/sec) vs. nozzle distance (in μm) for various working examples as described below.

FIG. 3 shows the results of ink jetting the various compositions, and the results of small drop mergers (SDM/sec) vs. distance from the nozzle (μm). As can be seen in FIG. 3, all aqueous green inkjet ink compositions according to the present invention (Invention Examples 4-8) exhibited small drop mergers that were less than the control line (solid line). The Control line represents an aqueous pigmented ink that exhibited acceptable small drop merger at the noted nozzle distances with minimal "pepper spray". Comparative Example 3, which was a separately milled blend of green and yellow organic pigment dispersions, had similar numbers of small drop mergers as the Control black ink and Comparative Example 4 that contained only the milled green organic pigment exhibited unacceptable numbers of small drop mergers upon jetting over the entire range of nozzle distances.

Spectrophotometric data (L*, a*, and b* values) for several aqueous green inkjet ink compositions are shown below in TABLE II. As can be seen from these data, the aqueous green inkjet ink compositions according to the present invention exhibited desired spectrophotometric values and provided for increased color gamut for a typical cyan-magenta-yellow-black inkjet color set. The Comparative Example 4 aqueous green inkjet ink composition prepared like the other ink compositions but using the Comparative Example 1 dispersion exhibited an inferior b* value.

TABLE II

|  | L* | a* | b* |
|---|---|---|---|
| Invention Example 4 | 64.22 | −76.14 | 44.03 |
| Invention Example 5 | 61.68 | −80.21 | 46.37 |
| Invention Example 6 | 60.46 | −82.02 | 47.37 |
| Invention Example 8 | 68.41 | −68.22 | 32.63 |
| Comparative Example 4 | 69.51 | −57.58 | −8.56 |

An additional advantage of co-milling the green copper phthalocyanine and a yellow mono-azo-coupled β-ketoamide organic pigments described above can be observed in the clarity of the resulting aqueous green inkjet ink composition, as measured by a Status T optical density test that is the wide band color reflection densitometer response and is the accepted U.S. standard for color reflection densitometers. Each inventive aqueous green inkjet ink composition contained 2.5 or 3 weight % of total organic pigment, and showed an advantage in density due to the smaller organic pigment size and resulting higher organic pigment particle surface area. Optical densities were measured using a Gretag Macbeth Spectro Scan instrument D50 2° observation angle. The data from the measurements are provided in the following TABLE III.

TABLE III

|  | StT V | StT R | StT G | StT B |
|---|---|---|---|---|
| Comparative Example 5 | 100% | 100% | 100% | 100% |
| Invention Example 4 | 114% | 118% | 115% | 128% |
| Invention Example 5 | 123% | 134% | 126% | 140% |

The invention has been described in detail with particular reference to certain preferred embodiments thereof, but it will be understood that variations and modifications can be effected within the spirit and scope of the invention.

The invention claimed is:

1. A method of inkjet printing, comprising:
providing a substrate,
ink jetting an aqueous green inkjet ink composition as spaced green drops to provide a green color image on the substrate,
wherein the aqueous green inkjet ink composition comprises:
(a) an aqueous organic pigment dispersion comprising:
a green copper phthalocyanine pigment,
an azo-coupled β-ketoamide pigment, and
at least one organic pigment dispersant in an amount of at least 40 weight % and up to and including 100 weight %, based on the sum of the weights of the green copper phthalocyanine pigment and the azo-coupled β-ketoamide pigment,
the weight ratio of the green copper phthalocyanine pigment to the azo-coupled β-ketoamide pigment is from 1:1 to and including 10:1, and
the median particle diameter of each of the green copper phthalocyanine pigment and the azo-coupled β-ketoamide pigment is less than 85 nm and at least 95% of the total particles of each of the green copper phthalocyanine pigment and the azo-coupled β-ketoamide pigment have a particle diameter of less than 150 nm when measured in intensity mode using a laser light scattering particle size analyzer, and
(b) at least one humectant,
the aqueous green inkjet ink composition having a viscosity of less than 3 centipoise (0.003 N-sec) at 25° C.

2. The method of claim 1, comprising:
ink jetting the aqueous green inkjet ink composition from a main fluid supply as a continuous stream that is broken into both the spaced green drops and non-printing green drops; and
collecting and returning the non-printing green drops to the main fluid supply.

3. The method of claim 1, wherein the aqueous green inkjet ink composition is provided as spaced green drops and non-printing green drops using a continuous inkjet printing apparatus.

4. The method of claim 3, comprising:
delivering an aqueous green inkjet ink composition to a first drop generator mechanism,
ejecting the aqueous green inkjet ink composition from the first drop generator mechanism as spaced green drops in a controlled manner to provide a green color image on the substrate;
delivering an additional aqueous color inkjet ink composition to a second drop generator mechanism, which additional aqueous color inkjet ink composition comprises a colorant that is not a green colorant, and
ejecting the additional aqueous color inkjet ink composition from the second drop generator mechanism as spaced additional color drops in a controlled manner to provide an additional color image on the substrate.

5. The method of claim 4, comprising:

delivering the additional aqueous color inkjet ink composition from an additional main fluid supply as a continuous stream that is broken into both the spaced additional color drops and additional non-printing color drops;

collecting and returning the additional non-printing color drops to the additional main fluid supply.

6. The method of claim 1, comprising ink jetting the aqueous green color inkjet ink composition at a frequency of at least 350 kHz with a near nozzle velocity of at least 15 m/sec.

7. The method of claim 1, wherein the aqueous green color inkjet ink composition has a viscosity of less than or equal to 2 centipoise (0.002 N-sec) at 25° C.

8. The method of claim 1, wherein the aqueous green inkjet ink composition further comprising an anionic polyurethane having an acid number of at least 50 or an anionic acrylic or anionic styrene-acrylic polymer, or both the anionic polyether polyurethane and the anionic acrylic or anionic styrene-acrylic polymer.

9. The method of claim 1, wherein the weight ratio of the green copper phthalocyanine pigment to the azo-coupled β-ketoamide pigment in the aqueous green inkjet ink composition is from 3:1 to and including 6:1.

10. The method of claim 1, wherein the aqueous green inkjet ink composition exhibits CIELAB color characteristics of a* of at least −80 and up to and including −20, b* of at least 20 and up to and including 80, and L* of at least 20 and up to and including 90.

11. The method of claim 1, wherein the azo-coupled β-ketoamide pigment is a yellow mono-azo-coupled β-ketoamide pigment.

12. The method of claim 1, wherein the green copper phthalocyanine pigment is a halogenated green copper phthalocyanine pigment.

13. The method of claim 1, wherein the green copper phthalocyanine pigment is C.I. Pigment Green 7 and the azo-coupled β-ketoamide pigment is Pigment Yellow 74.

14. The method of claim 1, wherein the green copper phthalocyanine pigment is present in the aqueous green inkjet ink composition in an amount of at least 1 weight % and up to and including 5 weight %, based on the total weight of the aqueous green inkjet ink composition.

* * * * *